United States Patent
Borchert et al.

[15] 3,676,375
[45] July 11, 1972

[54] ADAMANTYL EPOXIDE POLYMERS

[72] Inventors: Alfred E. Borchert, Cherry Hill, N.J.; Eugene C. Capaldi, Broomall, Pa.

[73] Assignee: Atlantic Richfield Company, Philadelphia, Pa.

[22] Filed: June 12, 1970

[21] Appl. No.: 57,856

Related U.S. Application Data

[62] Division of Ser. No. 686,842, Nov. 30, 1967, Pat. No. 3,536,732.

[52] U.S. Cl..........................260/2 A, 260/88.3 A, 260/615 B
[51] Int. Cl.............................................................C08g 23/02
[58] Field of Search............................260/2 A, 615 B, 88.3 A

[56] References Cited

UNITED STATES PATENTS 3,459,688  8/1969  Hsieh...........................................260/2

*Primary Examiner*—William H. Short
*Assistant Examiner*—Earl A. Nielsen
*Attorney*—Robert R. Cochran

[57] ABSTRACT

Novel compositions of matter comprising polymers of adamantyl epoxides and adamantyl epoxides useful as intermediates in the preparation of said polymers. The polymers are useful in making wax additives, gaskets and rubber-like compositions.

A process for the preparation of adamantyl epoxides comprising contacting an alkenyl adamantane with an oxidizing agent selected from the group consisting of organic peracids and their derivatives, inorganic peracids, halogenhydrins and their derivatives, hydrogen peroxide, and organic hydroperoxides.

3 Claims, No Drawings

ADAMANTYL EPOXIDE POLYMERS

This is a divisional of application Ser. No. 686,842, filed Nov. 30, 1967, now U.S. Pat. No. 3,536,732.

BACKGROUND OF THE INVENTION

This invention relates to novel compositions of matter selected from the group consisting of (A) and (B), wherein (A) and (B) are characterized by the formula hereinafter referred to as

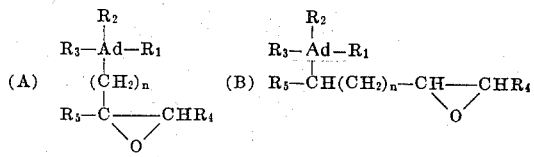

wherein Ad represents the adamantane nucleus, $R_1$ and $R_2$ attached to bridgehead carbon atoms are individually selected from the group consisting of hydrogen and alkyl groups having from one to 10 carbon atoms, $R_3$ attached to a bridgehead carbon atom is selected from the group consisting of hydrogen, alkyl groups having from one to 10 carbon atoms and alkenyl groups having from two to 10 carbon atoms and $R_4$ and $R_5$ are selected from the group consisting of hydrogen and alkyl groups having from one to 10 carbon atoms and $n$ is a number which is zero to 10, with the proviso that the total number of carbon atoms in said alkyl groups and said alkenyl group combined does not exceed 20, and the total number of carbon atoms in said alkyl groups $R_4$ and $R_5$ does not exceed 10.

This invention also relates to the method of preparation of adamantane derivative compounds as hereinabove defined.

The carbon nucleus of adamantane contains 10 carbon atoms arranged in a completely symmetrical, strainless manner such that there are three condensed six-member rings and four bridgehead carbon atoms. The structure of adamantane ($C_{10}H_{16}$) is commonly depicted as follows:

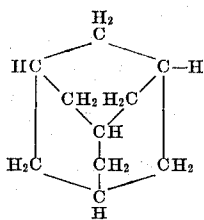

hereinafter referred to as

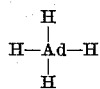

wherein Ad represents the adamantane nucleus.

The molecule contains four tertiary hydrogen atoms attached respectively at the bridgehead carbon atoms. All four bridgehead carbons are equivalent to each other, and likewise, all rings are equivalent.

SUMMARY OF INVENTION

In accordance with our invention we have now discovered that adamantyl substituted epoxides can be prepared by contacting an alkenyl adamantane with an oxidizing agent such as for example organic peracids and their derivatives, inorganic peracids, halogenhydrins, and their derivatives, and hydrogen peroxide. In addition, the adamantyl substituted epoxides can be prepared by the oxidation of alkenyl adamantanes by the use of organic hydroperoxides in the presence of a catalyst to give high yields of the corresponding epoxides.

In carrying out the method of our invention the peracids can be contacted directly with the alkenyl adamantane or in the alternative, the peracid can be formed in situ by reacting the organic acid with hydrogen peroxide to thereby form the organic peracid, which is then reacted with the alkenyl adamantane derivative compound. As starting organic acids there can be used, for example, formic acid, acetic acid, metachlorobenzoic acid and the higher homologues thereof. The epoxidation reaction can be accelerated, employing for this purpose catalysts, such as for example mineral acids, such as sulfuric acid. Additionally, ion exchange resins can be used as catalysts.

The adamantyl substituted epoxides can also be prepared by the liquid phase oxidation of the alkenyl adamantanes comprising contacting the alkenyl adamantane derivative compound with an organic hydroperoxide in the liquid phase at a temperature in the range of from about 50° C. to about 200° C., in the presence of a catalyst selected from the group consisting of metallic molybdenum and at least one compound of molybdenum. The use of metallic molybdenum and at least one compound of molybdenum in the preparation of epoxy compounds is disclosed in Belgium Pat. No. 674,076, incorporated herein by reference, assigned to The Atlantic Refining Company, now the Atlantic Richfield Company. Representative adamantyl substituted epoxides that can be prepared in accordance with our invention are:

1-epoxyethyladamantane
1-epoxyethyl-3-methyladamantane
1-epoxyethyl-3,5,7-trimethyladamantane
1-epoxyethyl-3-ethyladamantane
1-epoxyethyl-3,5-dipropyladamantane
1-epoxyethyl-3-decyladamantane
1-(2,3-epoxypropyl)adamantane
1-(2,3-epoxypropyl)-3,5-dimethyladamantane
1-(2,3-epoxypropyl)-3-hexyladamantane
1-(2,3-epoxydecyl)adamantane
1-allyl-3-(epoxyethyl)adamantane
1-allyl-3-(2,3-epoxypropyl)adamantane
1-(2,3-epoxypropyl)-3-vinyladamantane
1-hexyl-3-(2,3-epoxypropyl)-5-octyl)-7-vinyladamantane
1-vinyl-3-(1,2-epoxypropyl)adamantane
1-(2,3-epoxynonyl)adamantane
1-(1,2-epoxyhexyl)adamantane Each of the above-named compounds is formed by the oxidation of the corresponding alkenyl adamantane.

The adamantyl epoxides produced in accordance with the method of our invention have utility as intermediates in the preparation of polymers. The polymers produced from the adamantyl epoxides are thermoplastic in nature having elastomeric properties and hence, they can be used as lube oil additives, wax additives, caulking compounds, adhesive components, etc. Polymers produced from epoxides containing unsaturation, i.e., adamantyl epoxides having an alkenyl substituent at a bridgehead position are useful in elastomer application. The polymers produced from adamantyl epoxides having said alkenyl substituent at a bridgehead position can be vulcanized thereby imparting additional strength to said polymer. When vulcanized the polymers can be used as compositions for gaskets, hoses and rubber compositions in general.

It is therefore an object of our invention to provide novel compositions of matter comprising adamantyl epoxides and the polymers thereof.

It is another object of our invention to provide a novel method for the preparation of adamantyl substituted epoxides.

Other objects, advantages and features of our invention will be apparent to those skilled in the art without departing from the spirit and scope of our invention, and it should be understood that the latter is not necessarily limited to the accompanying discussion.

In one aspect our invention relates to novel compositions of matter and the polymers thereof wherein said novel compositions of matter are selected from the group consisting of (A) and (B) wherein (A) and (B) are characterized by the formula

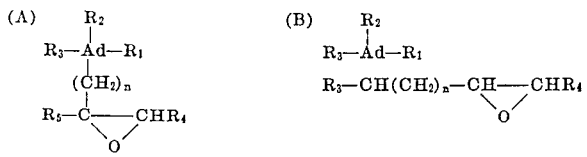

wherein Ad represents the adamantane nucleus, $R_1$ and $R_2$ are individually selected from the group consisting of hydrogen and alkyl groups having from one to 10 carbon atoms, $R_3$ is selected from the group consisting of hydrogen, alkyl groups having from one to 10 carbon atoms and alkenyl groups having from two to 10 carbon atoms and $R_4$ and $R_5$ are selected from the group consisting of hydrogen and alkyl groups having from one to 10 carbon atoms and $n$ is a number which is zero to 10, with the proviso that the total number of carbon atoms in said alkyl groups and said alkenyl group combined does not exceed 20, and the total number of carbon atoms in said alkyl groups $R_4$ and $R_5$ does not exceed 10.

In another aspect our invention relates to a method for preparing adamantyl substituted epoxides comprising contacting an alkenyl adamantane with a material selected from the group consisting of organic peracids and their derivatives, inorganic peracids, halogen hydrides and their derivatives, hydrogen peroxide and organic hydroperoxides.

PREFERRED EMBODIMENT

In accordance with the method of our invention, an alkenyl adamantane is reacted with an oxidizing agent in order to produce the epoxide of the alkenyl adamantane. Suitable oxidizing agents are, for example, organic peracids and their derivatives, inorganic peracids, halogen hydrins and their derivatives, and hydrogen peroxide. Particularly suitable and preferred oxidizing agents for use in the method of our invention are organic hydroperoxides wherein said reaction is carried out in the presence of a catalyst which is metallic molybdenum or a compound of molybdenum.

The method of our invention can be most readily understood by reference to the following equations wherein $R_1$, $R_2$, $R_3$, $R_4$ and $R_5$ are the substituents as previously defined.

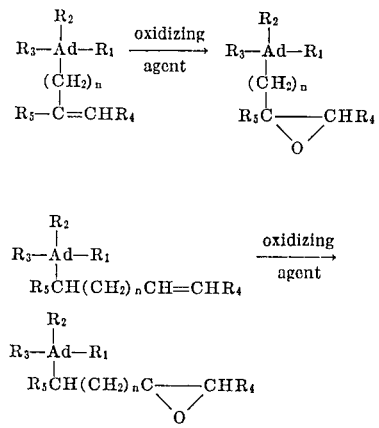

The starting materials for use in the method of our invention can be most readily prepared by the methods disclosed in our copending application filed concurrently herewith, entitled ALKENYL ADAMANTANES, Ser. No. 686,840 which is now U.S. Pat. No. 3,457,318. A copy of the specification directed to ALKENYL ADAMANTANES is attached hereto and made a part hereof.

Methods for preparing vinyladamantanes are disclosed in the copending application of Capaldi, E.C. et al. filed concurrently herewith, entitled VINYLADAMANTANES, Ser. No. 686,843 which is now U.S. Pat. No. 3,433,844. A copy of the specification directed to VINYLADAMANTANES is attached hereto and made a part hereof.

In accordance with the preferred method of our invention, an alkenyl adamantane is reacted with an organic hydroperoxide in liquid phase in the presence of metallic molybdenum or one or more compounds of molybdenum as the catalyst to produce the epoxide of the olefinic compound. The epoxides produced in accordance with this invention are the epoxy compounds wherein an oxygen atom is attached to adjacent carbon atoms, i.e., they have an oxirane ring.

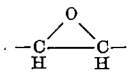

The organic hydroperoxides which are utilized as epoxidizing agents in this invention are characterized by having the structure ROOH wherein R may be alkyl, alkenyl, aryl, alkaryl, aralkyl, cycloalkyl, cycloalkenyl and similar radicals which also contain functional groups. The hydroperoxide may be either an externally produced compound which is added to the reaction or it may be produced in situ. When produced in situ the olefin being epoxidized is contacted with an oxygen-containing gas such as air to convert a portion of the olefin to the hydroperoxide which in turn reacts with additional olefin to produce the epoxide as will be described. It is well known in the art of air oxidation of hydrocarbons that hydroperoxides are one of the primary products formed in the reaction. Examples of the organic hydroperoxides which may be employed are tertiary-butyl hydroperoxide, cumene hydroperoxide, alpha-hydroperoxy diisopropyl ketone, the hydroperoxide of 2,6-ditertiary-butyl paracresol, tetralin hydroperoxide, cyclohexene hydroperoxide, the hydroperoxide of 2-methylpentene-2, the hydroperoxide of octene-1, and para-nitrocumene hydroperoxide. The foregoing are merely examples of the various organic hydroperoxides which may be employed. The most preferred of these are tertiary-butyl hydroperoxide and cumene hydroperoxide.

The catalysts which are utilized in the process of this invention are metallic molybdenum and compounds of molybdenum. These compounds include the oxides, for example molybdenum dioxide, molybdenum sesquioxide, molybdenum trioxide, molybdenum pentoxide, the chlorides, for example molybdenum pentachloride, the coordinate complexes such as molybdenum hexacarbonyl, and in particular the acids and the corresponding salts wherein the molybdenum is contained in the anionic portion of the molecule. Molybdic acid, and its corresponding salts, the molybdates, are particularly preferred as catalyst components. In addition to these simple compounds the high molecular weight complex heteropoly acids and salts are particularly useful and combinations of the simple salts with the heteropoly salts have been found to be especially useful catalysts.

The molybdenum compounds which can be employed as catalysts include not only those molybdenum compounds which are soluble inorganic compounds, but also those molybdenum compounds which are insoluble or which have only limited solubility as catalysts, plus any molybdenum compound and also metallic molybdenum may be employed as the catalyst for the epoxidation reaction of the present invention.

The reaction temperature which is employed in carrying out the epoxidation reaction in accordance with the process of our invention can vary within the range from about 50° C. to about 200° C. Temperatures in the range of from about 100° C. to about 180° C. are particularly suitable and preferred.

The pressure at which the reaction is carried out is not critical, it is only necessary that the pressure be sufficient to maintain the reaction in the liquid state. Additional details and variations in the method of operation in the epoxidation which can be used in the present invention are set forth in Belgium Pat. No. 674,076 (1966), incorporated herein by reference, to Ming Nan Sheng and John G. Zajacek.

Although the preferred method of epoxidation utilizes the organic hydroperoxides in the presence of a catalyst selected from the group consisting of metallic molybdenum and at least one compound of molybdenum, it will be apparent to those skilled in the art that the other methods of epoxidation as set forth can also be used. For example, the alkenyl adamantane can be reacted with chlorobenzoic acid in the presence of a chloroform solvent at a temperature in the range of from about 5° C. to approximately 50° C.

The epoxyadamantane can be recovered from the reaction media in a conventional manner. For example, the reaction products can be washed with water, a saturated sodium bisulfide solution, water, a saturated sodium carbonate solution, followed by a subsequent washing in water and thence drying over magnesium sulfate. Removal of the solvent, for example, by distillation, results in the recovery of a substantially pure epoxy adamantane.

The method of our invention will be more fully understood by reference to the following examples.

EXAMPLE I

To a stirred solution of 18.1 gms. (0.105 mole) of m-chloroperbenzoic acid in 300 ml. of chloroform at 5° C. there was slowly added 16.2 gms. (0.10 mole) of 1-vinyladamantane. The reaction mixture was thereafter washed with a saturated sodium bisulfite solution, water, a saturated sodium carbonate solution, water and then dried over magnesium sulfate. Removal of the solvent gave the crude product which was purified by distillation to furnish 15.3 gms. (86 percent yield) of 1-epoxyethyladamantane.

EXAMPLE II

To a stirred solution of 18.1 gms. (0.105 mole) of m-chlorobenzoic acid in 300 ml. of chloroform at 5° C. there was slowly added 17.6 gms. (0.10 mole) of 1-allyladamantane. The reaction mixture was maintained at 5° C. for 28 hours. The reaction mixture was thereafter washed with a saturated sodium bisulfite solution, water, a saturated sodium carbonate solution, water and then dried over magnesium sulfate. Removal of the solvent gave the crude product which was purified by distillation to furnish 16.3 gms. (85 percent yield) of 1-(2,3-epoxypropyl)adamantane.

EXAMPLE III

A mixture of 9.0 gms. (0.10 mole) of tertiary butyl hydroperoxide, 24.3 gms. (0.15 mole) of 1-vinyladamantane, and 0.015 gm. of molybdenum hexacarbonyl in 20 ml. of benzene was refluxed at atmospheric pressure for 1.5 hours. Distillation of the crude product furnished 1-epoxyethyladamantane in an 80 percent yield.

EXAMPLE IV

A mixture of 0.10 mole of tertiarybutyl hydroperoxide, 0.15 mole of 1-allyl-3-octyladamantane, and 0.015 gm. of molybdenum hexacarbonyl in 20 ml. of benzene was refluxed at atmospheric pressure for 1.5 hours. Distillation of the crude product furnishes 1-(2,3-epoxypropyl)-3-octyladamantane in a yield in excess of 30 percent.

EXAMPLE V

A mixture of 0.10 mole of tertiarybutyl hydroperoxide, 0.15 mole of 1-(2-octenyl)-3-ethyl-5-hexyl-7-methyl-adamantane and 0.015 gm. of molybdenum hexacarbonyl in 20 ml. of benzene was refluxed at atmospheric pressure for 1.5 hours. Distillation of the crude product furnishes 1-(2,3-epoxyoctyl)-3-ethyl-5-hexyl-7-methyladamantane(yield in excess of 30 percent).

EXAMPLE VI

A mixture of 0.10 mole of tertiarybutyl hydroperoxide, 0.15 mole of 1-allyl-3-vinyladamantane and 0.015 gm.. of molybdenum hexacarbonyl in 20 ml. of benzene was refluxed at atmospheric pressure for 1.5 hours. Distillation of the crude product furnishes 1-(2,3-epoxypropyl)-3-vinyladamantane in a yield in excess of 10 percent and 1-allyl-3-epoxyethyladamantane in a yield in excess of 5 percent.

EXAMPLE VII

A mixture of 0.10 mole of tertiarybutyl hydroperoxide, 0.15 mole of 1,3-diallyladamantane and 0.015 gm. of molybdenum hexacarbonyl in 20 ml. of benzene was refluxed at atmospheric pressure for 1.5 hours. Distillation of the crude product furnishes 1-allyl-3-(2,3-epoxypropyl)adamantane in a yield in excess of 30 percent.

EXAMPLE VIII

The following were charged to a dry pyrex glass tube under a nitrogen atmosphere: 10 ml. of purified 1,4-dioxane, 0.62 mmole of triisobutylaluminum, 0.31 mmole of water (the latter two components prereacted as 1 molar benzene solutions) and 0.4 gm. (1.2 mmole) of trisacetylacetonato-aluminum. After aging for 1 hour at 26° C., 3.1 gms. of 1-(2,3-epoxypropyl)adamantane was added, the tube was sealed under vacuum and polymerization was carried out at 110° C. for 48 hours by agitating in an oil bath. Poly(1-(2,3-epoxypropyl)adamantane) was isolated as a colorless solid (94 percent yield) by precipitation from excess water containing approximately 5 percent hydrochloric acid followed by freeze drying from benzene.

EXAMPLE IX

The following were charged to a dry pyrex glass tube under a nitrogen atmosphere: 10 ml. of purified 1,4-dioxane, 0.62 mmole of triisobutylalaminum, 0.31 mmole of water (the latter two components prereacted as 1 molar solutions in benzene) and 0.4 gm. (1.2 mmole) of trisacetylacetonato-aluminum. After aging for 1 hour at 26° C., 2.86 gms. of 1-(epoxyethyl)adamantane was added; the tube was sealed under vacuum and polymerization was carried out at 110 C. for 48 hours by agitating in an oil bath. Poly(1-(epoxyethyl)adamantane) was isolated as an oil (60 percent yield) by precipitation from excess water containing approximately 5 percent hydrochloric acid followed by washing and drying at 40° C. under vacuum.

EXAMPLE X

The following were charged to a dry pyrex glass tube under a nitrogen atmosphere: 10 ml. of purified 1,4-dioxane, 0.4 g. of triisobutylaluminum pyrolate and 0.3 g. of redistilled triethylamine said catalyst being described in U.S. Pat. No. 3,489,691, particularly in Example IX. After aging at 26° C. for 0.5 hour, a mixture of 0.3 gms. of 1-(2,3-epoxypropyl)adamantane and 8.3 gms. of propylene oxide was added. The tube was sealed under vacuum and agitated at 110°C. for 48 hours. The copolymer was isolated as a light cream colored solid (99 percent yield) by precipitation from excess water containing approximately 5 percent hydrochloric acid followed by washing and drying at 40°C. under vacuum.

EXAMPLE XI

The following is charged to a dry pyrex glass tube under a nitrogen atmosphere: 10 ml. of purified 1,4-dioxane, 0.62 mmole of triisobutylaluminum and 0.31 mmole of water. Trisacetylacetonatoaluminum, 0.6 g. (1.8 mmole) is added and the system is aged at 26° C. for 1 hour. A mixture of 5 mmole of 1-(epoxyethyl)adamantane and 25 mmole of styrene oxide is added; the tube is sealed under vacuum and polymerization is carried out at 90° C. for 72 hours. The copolymer mixture is isolated by precipitation from excess water containing approximately 5 percent hydrochloric acid followed by washing and freeze drying from benzene. The yield of the copolymer is in excess of 10 percent.

The method of preparation of the adamantyl epoxides is shown in examples I to VII. Where bridgehead substituted alkenyl adamantanes having from one to three alkyl substituents are substituted for bridgehead substituted alkenyl adamantanes having no alkyl substituents, substantially similar results are obtained. Examples IV and V specifically show the conversion of bridgehead substituted alkenyl adamantanes having alkyl substituents, to the corresponding adamantyl epoxides. Examples VIII through XI show the method of preparation of polymers, i.e. homopolymers and copolymers, of adamantyl epoxides.

In each of the examples hereinabove set forth analysis of the products of the reactions is obtained through means of nuclear magnetic resonance, infrared and elemental analysis. The analysis of the monomers confirms the presence of the epoxide group at a bridgehead position of the adamantyl nucleus. The analysis of the polymers confirms the expected structure.

While our invention has been described in detailed examples with particular reference to specific embodiments, it will be appreciated that no unnecessary limitations are to be understood therefrom. The invention is not limited to the exact details shown and described, for obvious modifications will occur to those skilled in the art. The embodiments of the invention in which an exclusive property or privilege is claimed are defined by the appended claims.

We claim:

1. Homopolymers and copolymers with propylene oxide or styrene oxide of a compound characterized by the formula

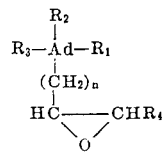

wherein Ad represents the adamantane nucleus, $R_1$ and $R_2$ are individually selected from the group consisting of hydrogen and alkyl groups having from one to 10 carbon atoms, $R_3$ is selected from the group consisting of hydrogen, alkyl groups having from one to 10 carbon atoms and alkenyl groups having from two to 10 carbon atoms, $R_4$ is selected from the group consisting of hydrogen and an alkyl group having from one to 10 carbon atoms and $n$ is an integer equal to 0 or 1, with the proviso that the total number of carbon atoms in said alkyl groups and said alkenyl group ($R_1 + R_2 + R_3$) combined does not exceed 20.

2. The compositions according to claim 1 wherein $R_1$, $R_2$ and $R_3$ are each hydrogen.

3. The compositions according to claim 1 wherein $R_4$ is hydrogen or a methyl radical.

* * * * *